United States Patent [19]

Mizutani et al.

[11] 4,344,391
[45] Aug. 17, 1982

[54] IGNITION TIMING CONTROL MEANS FOR INTERNAL COMBUSTION ENGINES

[75] Inventors: Masashi Mizutani; Shiro Nakamura, both of Hamamatsu, Japan

[73] Assignee: Yamaha Hatsudoki Kabushiki Kaisha, Iwata, Japan

[21] Appl. No.: 109,988

[22] Filed: Jan. 7, 1980

Related U.S. Application Data

[62] Division of Ser. No. 915,237, Jun. 13, 1978, abandoned.

[51] Int. Cl.³ .................... F02P 5/10; F02P 5/06; B62M 7/04; F01C 1/30
[52] U.S. Cl. .................. 123/146.5 A; 180/219; 180/297
[58] Field of Search ............... 123/146.5 A; 180/219, 180/297

[56] References Cited

U.S. PATENT DOCUMENTS

| | | | |
|---|---|---|---|
| 1,735,425 | 11/1929 | Froesch | 180/297 |
| 2,060,583 | 11/1936 | Lewis | 180/219 |
| 3,783,314 | 1/1974 | Kostan | 123/146.5 A |
| 3,948,232 | 4/1976 | Gould et al. | 123/146.5 A |
| 4,129,104 | 12/1978 | Kawakami | 123/146.5 A |

FOREIGN PATENT DOCUMENTS 1383079 2/1975 United Kingdom ............... 180/219

OTHER PUBLICATIONS

Pp. 54-57—Motorcycle Repair Manual 1972, Lib. Cong No. 72-85366.

*Primary Examiner*—Raymond A. Nelli
*Attorney, Agent, or Firm*—Fleit & Jacobson

[57] ABSTRACT

Ignition timing control device for internal combustion engines, which comprises a base mounted on the engine crankcase and rotatably carrying a control disc which is co-axial with a driving shaft adapted to be driven by the engine crankshaft. The control disc carries one or more ignition signal generating units and the base carries an intake pressure responsive device which determines the position of the control disc in accordance with the engine intake pressure.

10 Claims, 6 Drawing Figures

IGNITION TIMING CONTROL MEANS FOR INTERNAL COMBUSTION ENGINES

This is a divisional of U.S. Ser. No. 915,237 filed June 13, 1978, now abandoned.

The present invention relates to ignition timing control means for internal combustion engines and more particularly to ignition timing control means including ignition timing advancing means which is responsive to engine intake pressure.

Conventionally, ignition timing control means including intake pressure responsive ignition timing advancing means is comprised a rotatable control disc carrying ignition signal generating means, and intake pressure responsive means for determining the angle of rotation of the disc in accordance with the engine intake pressure. Since the control disc and the intake pressure responsive means are respectively mounted on the engine body, complicated work has been required in mounting these components and other parts associated therewith. Further, troublesome adjustment has had to be made after mounting these parts on the engine body.

It is therefore an object of the present invention to provide ignition timing control means including preassembled control disc and intake pressure responsive means.

Another object of the present invention is to provide ignition timing control means in which major adjustments can be made before it is mounted on the engine body.

A further object of the present invention is to provide ignition timing control means which is ready to assemble and easy for adjustment.

According to the present invention, the above and other objects can be accomplished by ignition timing control means for internal combustion engines, which comprises control disc means and intake suction pressure responsive means mounted on common base means which is adapted to be attached to the engine body. According to the present invention, the control disc carrying ignition signal generating means and the intake pressure responsive means can be mounted on the base means at precisely adjusted positions to provide a preassembled device, so that in assembling the engine it is only required to mount the preassembled device and adjust the position on the engine body.

In a preferable mode of the engine, the control disc is of a circular configuration having an outer periphery rotatably supported on the base means. In this arrangement, it is possible to minimize mechanical play of the control disc.

The ignition timing control means in accordance with the present invention is particularly suitable for use in internal combustion engines for motorcycles, however, the present invention is not limited to such a use.

The above and other objects and features of the present invention will become apparent from the following descriptions of a preferred embodiment taking reference to the accompanying drawings, in which.

Figure 1:
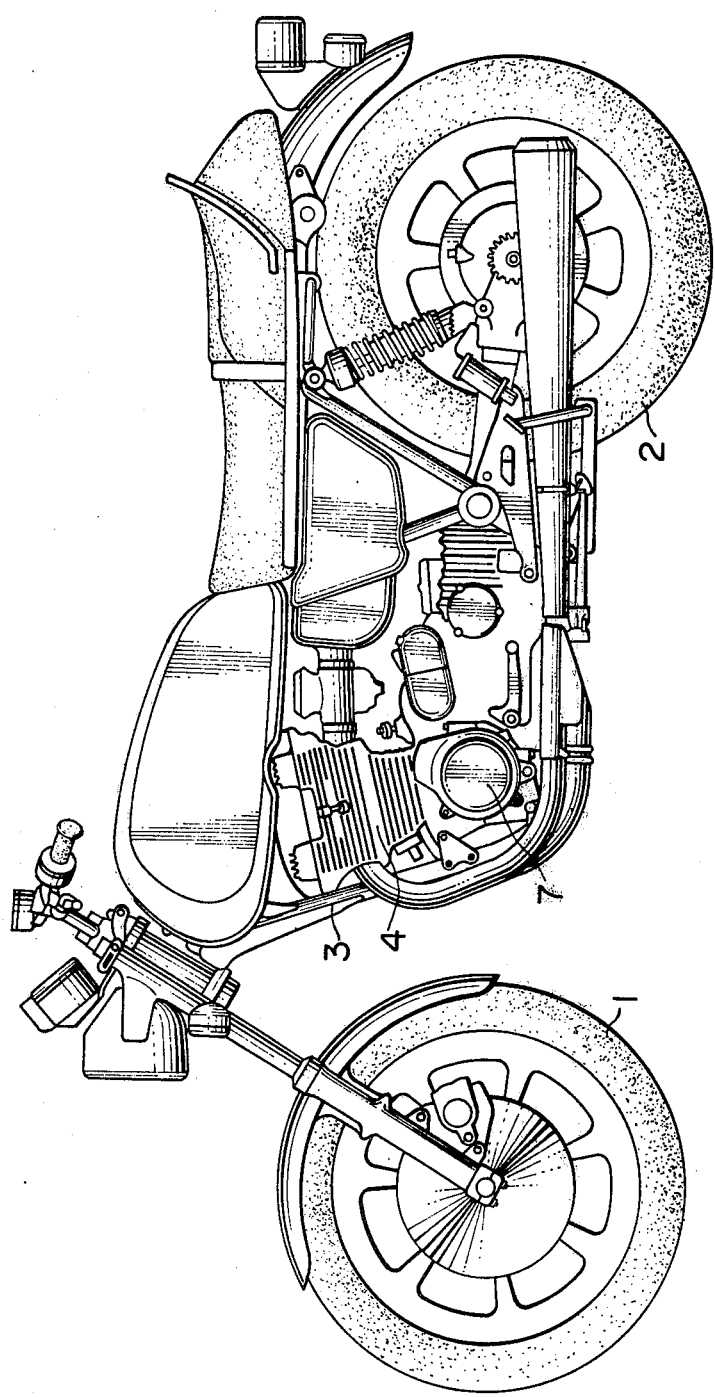
FIG. 1 is a side elevational view of a motorcycle to which the present invention can be applied.

Referring to the drawings, particularly to FIG. 1, there is shown a motorcycle which is suitable for incorporating the ignition timing control means in accordance with the present invention. The motorcycle shown in FIG. 1 includes a front wheel 1, a rear wheel 2, a frame 3 between the front and rear wheels 1 and 2, and an internal combustion engine 4 mounted on the frame 3.

Figure 2:
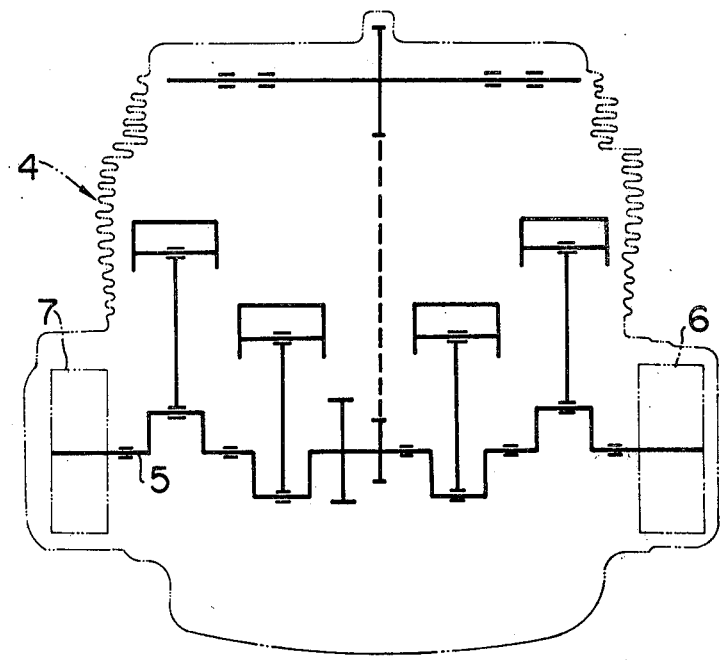
FIG. 2 is a diagrammatical section of the internal combustion engine for the motorcycle.

The engine 4 is of a four-cylinder type as shown in FIG. 2 and has a crankshaft 5 extending transversely with respect to the frame 3. At the right side of the engine, there is mounted a generator 6 which is adapted to be driven by the crankshaft 5. On the left side, there is provided an ignition timing control device 7 in accordance with one embodiment of the present invention.

Figure 3:
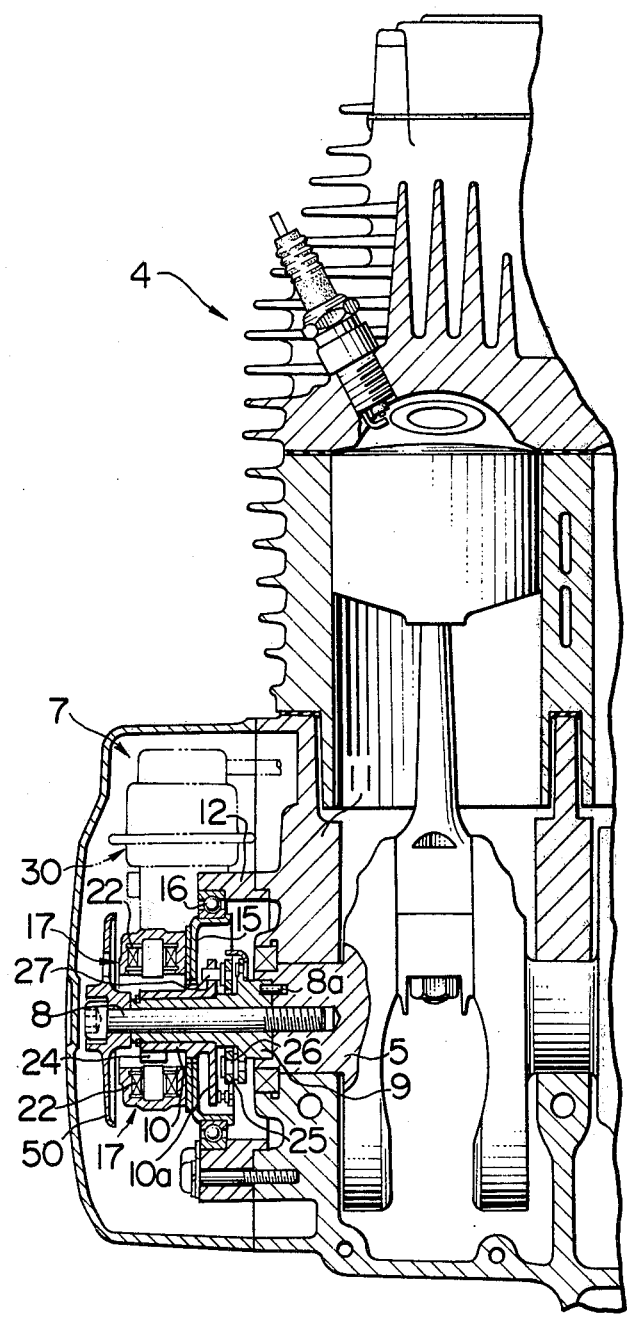
FIG. 3 is a vertical section of the ignition timing control device in accordance with one embodiment of the present invention.
Figure 4:
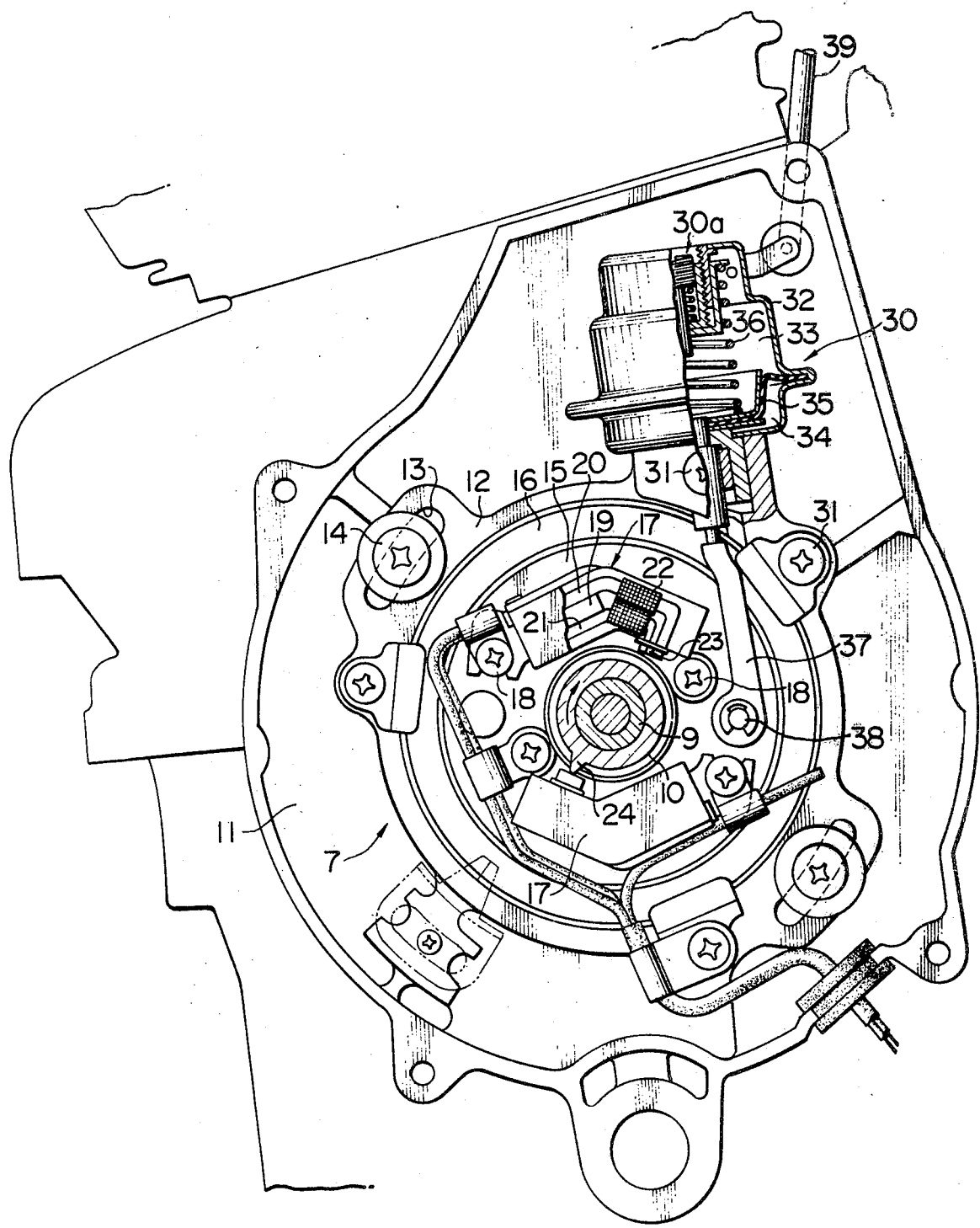
FIG. 4 is a side view of the ignition timing control device shown in FIG. 3 with the cover removed to show the interior.

Referring now to FIGS. 3 and 4, the ignition timing control device 7 includes a driving shaft 9 which is secured to the crankshaft 5 at the left end thereof by means of a bolt 8 and a locating pin 8a. The driving shaft 9 carries a governor shaft 10 which is rotable with respect to the driving shaft 9. The control device 7 further includes a base 12 which is mounted on the engine body or crankcase 11.

The base 12 is of an annular configuration and is provided with arcuated slots 13 through which screws 14 are threaded into the crankcase 11 so as to secure the base 12 in position. The annular base 12 carries a control disc 15 which is rotatably mounted thereon at its outer periphery through a bearing 16. In order to ensure a smooth rotation of the control disc 15, it is preferably to fill the bearing 16 with lubricant such as silicon oil. The control disc 15 has a central hole through which the driving shaft 9 and the governor shaft 10 extend.

The control disc 15 carries a pair of ignition signal generating units 17 which are mounted on the side of the disc 15 opposite to the side facing the crankcase 11 at diametrically opposite positions. As shown in FIG. 4, each unit 17 is secured to the control disc 15 by means of screws 18 and includes a permanent magnet 19 positioned between a pair of cores 20 and 21 which carry a coil 22. The cores 20 and 21 have ends opposed one to the other with a small gap 23 and projected toward the governor shaft 10.

The governor shaft 10 is made of a magnetic material and is formed at its outer surface with a reluctor 24 which is projecting radially outwardly. As the shafts 9 and 10 are rotated, the reluctor 24 is cyclically brought into a position facing to the gap 23 so that a magnetic path is formed through the cores 20 and 21 resulting in an increase in the magnetic flux density through the cores 20 and 21 and a corresponding change in the current through the coil 22.

Referring to FIG. 3, the driving shaft 9 has a centrifugal arm 25 which is mounted thereon at one end through a pin 26. At the other end, the arm 25 has a pin 27 which is engaged with a cam slot in a flange 10a formed on the governor shaft 10. It should therefore be noted that the position of the governor shaft 10 is changed with respect to the shaft 9 in accordance with the speed of the shaft 9. Thus, as far as the speed of the shaft 9 is maintained constant, the shafts 9 and 10 rotate as a unit maintaining the relative positions. The centrifugal governor arrangement makes it possible to control the ignition timing in accordance with the speed of the crankshaft 5.

Under a light load operation of the engine, the amount of residual combustion gas increases with respect to the amount of fresh charge of mixture so that there is a decrease in the rate of propagation of combustion flame. Therefore, it becomes necessary to advance the ignition timing in order to ensure a satisfactory combustion. For the purpose, there is provided an engine intake pressure responsive device 30 which is comprised of a casing 32 secured to the annular base 12 by means of screws 31, and a diaphragm 35 which separates the inside of the casing 32 into a suction pressure chamber 33 and an atmospheric pressure chamber 34. In the suction pressure chamber 33, there is disposed a spring 36.

Figure 5:
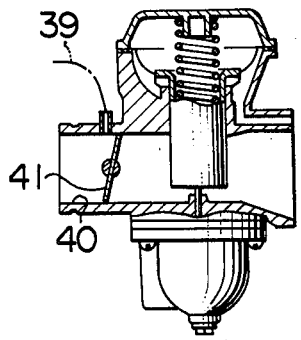
FIG. 5 is a fragmentary sectional view showing the engine intake passage.

Referring to FIG. 4, it will be noted that there is provided an adjusting mechanism 30a which is adapted to adjust the spring 36 and the stopper for the diaphragm 35. The diaphragm 35 is connected with a rod 37 which is in turn connected through a pin 38 with the control disc 15. Thus, the control disc 15 is angularly moved with respect to the base 12 by means of the diaphragm 35. The suction pressure chamber 33 is connected through a conduit 39 with the intake passage 40 of the engine at the downstream side of the throttle valve 41 as shown in FIG. 5. It is preferable that the diaphragm 35 be made of a heat resistant rubber such as fluorosilicon rubber so that it can withstand the heat to which it is exposed in use.

In operation of the engine under normal load, the diaphragm 35 is forced downwards under the influence of the spring 36 so that the control disc 15 is maintained at clockwise extreme position as seen in FIG. 4. The shaft 9 is rotated with the crankshaft 5 and, as far as the engine speed is constant, the governor shaft 10 is also rotated as a unit with the shaft 9. Each time when the reluctor 24 on the governor shaft 10 come to the position facing to the gap 23 between the cores 20 and 21 of the ignition signal generating unit 17, there is produced a change in the current through the coil 22 so that an ignition signal is produced. The ignition signal thus produced is directed to the control circuit for controlling the ignition timing.

Figure 6:
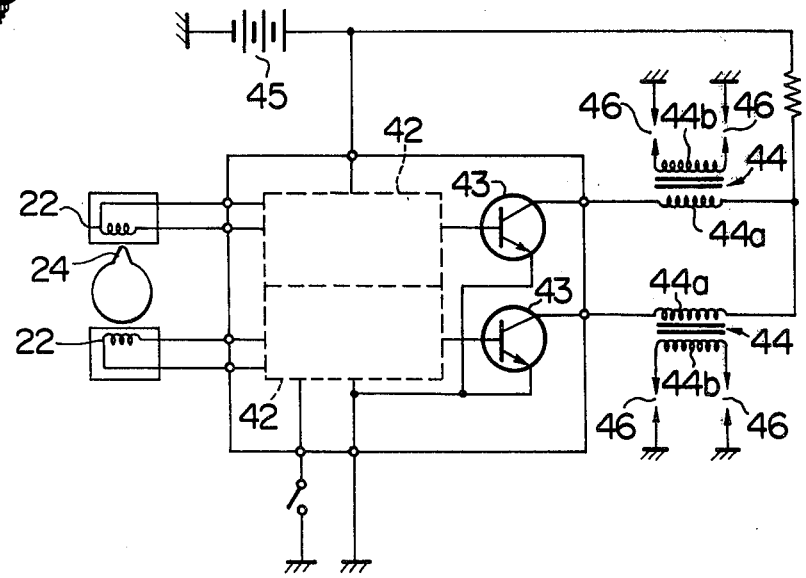
FIG. 6 is a diagram showing the ignition timing control circuit.

Referring now to FIG. 6 which shows an example of ignition control circuit, the coil 22 in each unit 17 is connected with a signal amplifier 42 which has an output connected with the base of a switching transistor 43. The transistor 43 has a collector which is connected through a primary winding 44a of an ignition coil 44 with an electric power source 45. The ignition coil 44 has a secondary winding 44b connected with ignition plugs 46. The transistor 43 is further grounded at the emitter.

In the illustrated embodiment, current is normally passed through the primary winding 44a of each ignition coil 44 and through the associated transistor 43. As soon as an ignition signal is produced in the coil 22, the base voltage in the corresponding transistor 43 is decreased so that the transistor 43 becomes non-conductive. Therefore, the current through the primary winding 44a is interrupted and a voltage is produced in the secondary winding 44b. Thus, ignition sparks are produced in the plugs 46. In the embodiment, each two pistons are moved at the same phase so that two plugs 46 are fired simultaneously.

As the engine speed increases, the centrifugal governor device functions in such a manner that the governor shaft 10 is rotated clockwise with respect to the driving shaft 9 as seen in the plane of FIG. 4 and, since the driving shaft 9 is rotated clockwise by the crankshaft, the ignition timing is advanced in response to an increase in the engine speed. For example, the ignition timing may be advanced by the centrifugal governor device from 0° at 1400 rpm to 31° BTDL at 4800 rpm.

Under a light load operation, the throttle valve 41 is closed or at the minimum opening position so that there is a decrease in the intake pressure. The decreased intake pressure is then introduced into the suction pressure chamber 33 in the device 30 and serves to move the diaphragm 35 upwards against the action of the spring 36. The control disc 15 is therefore rotated counterclockwise to advance the ignition timing. The advance of ignition timing under the light load operation may be 16° utmost in terms of the angle of rotation of the crankshaft.

In motorcycle engines, the amount of decrease in the intake pressure is small as compared with that in conventional automobile engines so that the diaphragm in the intake pressure responsive device should necessarily be a large area. However, in an actual design, it is preferable to make the area of the diaphragm as small as possible and use a spring which is as weak as possible.

In assembling the above ignition timing control means, the ignition signal generating units 17 and the intake pressure responsive device 30 are mounted on the base 12 at precisely determined locations and adjustments are then made with respect to the force of the spring 36 and the stopper for the diaphragm 36. Thereafter, the base 12 carrying the ignition signal generating units 17 and the intake pressure responsive means 30 is secured to the crankcase 11 by means of the screws 14. In mounting the base 12 on the crankcase 11, the only adjustment to be made is to precisely adjust the locations of the units 17 with respect to the reluctor 24. In order to facilitate the adjustment, it is preferable to provide a marking disc 50 on the shaft 9 as shown in FIG. 3.

In the illustrated embodiment, the ignition timing control means is mounted on the engine in such a manner that the intake pressure responsive means 30 is located above the driving shaft 9. This arrangement is particularly advantageous in a motorcycle having a multi-cylinder engine which is mounted thereon with the crankshaft extending transversely. In this type of motorcycle, the transverse dimension or width of the engine increases as the number of cylinder increases so that it becomes quite difficult to have the motorcycle inclined in operation for passing corners.

In an arrangement where the ignition timing is controlled under the intake pressure, it is necessary to make particular consideration on the position of the intake pressure responsive means. By locating the intake pressure responsive means above the driving shaft, it is possible to eliminate the problem of interference between the ground and the case in which the responsive means is housed. Further, by placing the pressure responsive means at a position rearwardly offset from a vertically upward position of the driving shaft, it is possible to decrease the length of conduit connecting the pressure responsive means with the intake passage of the carburetor. The illustrated arrangement provides a further advantage by supporting the control disc at the outer periphery thereof because the play of the disc can be minimized by such supporting arrangement.

The invention has thus been shown and described with reference to a specific embodiment, however, it should be noted that the invention is in no way limited to the details of the illustrated structures but changes and modifications may be made without departing from the scope of the appended claims. For example, the illustrated ignition signal generating means is of a contactless type, however, the invention can also be applied to a contact breaker type ignition signal generating device. In such a case the reluctor on the governor shaft may be substituted by a cam for actuating breaker contacts.

We claim:

1. In a motor cycle including front and rear wheels, a frame carried by the wheels, and a multi-cylinder internal combustion engine having a body portion and a crankshaft disposed transversely of the frame; ignition timing control means for controlling ignition timing, and comprising a base adapted to be mounted on the body portion of the engine, a control disc rotatably mounted on said base, driving shaft means provided at one end of the crankshaft of the engine for being driven thereby and arranged coaxially with respect to the control disc, ignition signal generating means provided on the control disc for generating an ignition signal, further means provided on said driving shaft means for making the generating means produce an ignition signal at a predetermined angular phase of the driving shaft means, intake pressure responsive means mounted on the base and responsive to intake pressure for determining positioning of the control disc, and connecting means between the intake pressure responsive means and the control disc for rotating the control disc by an angular extent corresponding to engine intake pressure so as to change the angular phase of the driving shaft means at which the ignition signal is generated;

the improvement wherein said intake pressure responsive means is disposed above said driving shaft means and at a position rearwardly offset from said driving shaft means, whereby interference between the ground and the intake pressure responsive means is avoided and interconnection of the intake pressure responsive means is provided efficiently and with a minimum amount of material.

2. In the motor cycle of claim 1, said intake pressure responsive means including a diaphragm of large area, said ignition timing control means further comprising a spring.

3. In the motor cycle of claim 1, said intake pressure responsive means including a diaphragm of small area, said ignition timing control means further comprising a spring.

4. In the motor cycle of claim 1, said intake pressure responsive means including a casing, an annular base, means for securing said casing to said annular base, and diaphragm means disposed within said casing for compartmenting said casing so as to form a suction pressure chamber and an atmospheric pressure chamber therein, said intake pressure responsive means further comprising a spring disposed in said suction pressure chamber.

5. In the motor cycle of claim 1, said intake pressure responsive means comprising a diaphragm having a spring and a stopper, said ignition timing control means further comprising adjusting means for adjusting said spring and said stopper.

6. In the motor cycle of claim 1, wherein said ignition signal generating means and said intake pressure responsive means are mounted on said base at predetermined locations, said intake pressure responsive means including a diaphragm having a spring and a stopper, said ignition timing control means further comprising adjusting means for making adjustments with respect to the force of said spring and said stopper.

7. In the motor cycle of claim 6, wherein said motor cycle includes a crankcase, further comprising securing means for securing said base to said crankcase.

8. In the motor cycle of claim 7, further comprising a reluctor, wherein said adjustments made by said adjusting means comprise only adjustments of the location of said ignition signal generating means with respect to said reluctor.

9. In the motor cycle of claim 8, wherein said adjusting means comprises a marking disc disposed on said driving shaft means.

10. In the motor cycle of claim 1, wherein said intake pressure responsive means is disposed above said driving shaft means.

* * * * *